(12) United States Patent
Kamimae

(10) Patent No.: US 12,275,297 B2
(45) Date of Patent: Apr. 15, 2025

(54) MOTOR GRADER

(71) Applicant: KOMATSU LTD., Tokyo (JP)

(72) Inventor: Takeshi Kamimae, Tokyo (JP)

(73) Assignee: KOMATSU LTD., Tokyo (JP)

( * ) Notice: Subject to any disclaimer, the term of this patent is extended or adjusted under 35 U.S.C. 154(b) by 429 days.

(21) Appl. No.: 17/632,802

(22) PCT Filed: Jul. 29, 2020

(86) PCT No.: PCT/JP2020/028954
§ 371 (c)(1),
(2) Date: Feb. 4, 2022

(87) PCT Pub. No.: WO2021/065178
PCT Pub. Date: Apr. 8, 2021

(65) Prior Publication Data
US 2022/0289012 A1     Sep. 15, 2022

(30) Foreign Application Priority Data

Sep. 30, 2019   (JP) ................................ 2019-178422

(51) Int. Cl.
*B60K 1/04*     (2019.01)
*E02F 3/76*     (2006.01)
*E02F 3/84*     (2006.01)

(52) U.S. Cl.
CPC ............... *B60K 1/04* (2013.01); *E02F 3/764* (2013.01); *E02F 3/84* (2013.01); *B60K 2001/0411* (2013.01); *B60Y 2200/411* (2013.01)

(58) Field of Classification Search
CPC .... E02F 3/764; E02F 3/84; B60K 2001/0411; B60K 2001/0483
See application file for complete search history.

(56) References Cited

U.S. PATENT DOCUMENTS

| | | | | |
|---|---|---|---|---|
| 4,142,600 | A | * | 3/1979 | Campbell .............. B60K 17/10 180/24.06 |
| 8,292,015 | B2 | * | 10/2012 | O'Quinn ................. B60L 50/66 180/68.5 |
| 8,875,823 | B2 | * | 11/2014 | Lauper, Jr. ................ F01P 5/06 180/68.5 |

(Continued)

FOREIGN PATENT DOCUMENTS

| | | |
|---|---|---|
| CN | 101484645 A | 7/2009 |
| CN | 103813918 A | 5/2014 |

(Continued)

*Primary Examiner* — Jeffrey J Restifo
(74) *Attorney, Agent, or Firm* — Faegre Drinker Biddle & Reath LLP

(57) ABSTRACT

A motor grader in which a motive power source of an electric motor can appropriately be arranged is provided. The motor grader includes a front frame, a rear frame, and a coupling shaft. The rear frame is arranged in the rear of the front frame. The coupling shaft couples the front frame to the rear frame as being pivotable with respect to the rear frame. The motor grader includes a front wheel rotationally driven to run the motor grader, the electric motor that generates driving force for rotationally driving the front wheel, and a battery in which electric power supplied to the electric motor is stored. The battery is arranged in front of the coupling shaft.

11 Claims, 9 Drawing Sheets

(56) References Cited

U.S. PATENT DOCUMENTS

| | | | |
|---|---|---|---|
| 9,051,711 B2 * | 6/2015 | Sharma | E02F 9/0841 |
| 9,103,098 B2 * | 8/2015 | Zhu | E02F 9/2087 |
| 9,234,330 B2 * | 1/2016 | Sharma | B62D 6/003 |
| 9,387,759 B2 * | 7/2016 | Wen | F16K 31/44 |
| 9,476,182 B2 * | 10/2016 | Nakanishi | E02F 9/0883 |
| 9,540,787 B2 * | 1/2017 | West | E02F 3/7668 |
| 10,668,830 B2 * | 6/2020 | Huff | B60L 58/21 |
| 10,836,242 B2 * | 11/2020 | Huff | B60K 17/354 |
| 10,889,960 B2 * | 1/2021 | Vahling | E02F 3/764 |
| 10,906,383 B2 * | 2/2021 | Huff | B60L 50/66 |
| 10,926,660 B2 * | 2/2021 | Hickey | B60L 58/18 |
| 11,305,746 B2 * | 4/2022 | Hickey | E21C 29/24 |
| 11,396,237 B2 * | 7/2022 | Hickey | B60L 50/64 |
| 11,453,996 B2 * | 9/2022 | Kovalick | F16J 15/3284 |
| 11,578,471 B2 * | 2/2023 | Gray | E02F 3/764 |
| 11,898,320 B2 * | 2/2024 | Vahling | E02F 9/2079 |
| 2014/0137528 A1 | 5/2014 | Sehygge et al. | |
| 2014/0139009 A1 * | 5/2014 | Bindl | B60K 7/0007 301/6.5 |
| 2015/0376863 A1 * | 12/2015 | Ziegenmeyer | E02F 9/2217 280/446.1 |
| 2017/0313180 A1 * | 11/2017 | Fliearman | F16D 13/76 |
| 2020/0299934 A1 * | 9/2020 | Ono | E02F 3/7654 |
| 2021/0140139 A1 * | 5/2021 | Matsuyama | B60K 17/356 |
| 2022/0098832 A1 * | 3/2022 | Hickey | B60L 58/22 |
| 2022/0289012 A1 * | 9/2022 | Kamimae | E02F 3/84 |

FOREIGN PATENT DOCUMENTS

| | | |
|---|---|---|
| CN | 109720219 A | 5/2019 |
| JP | 2003-285651 A | 10/2003 |
| JP | 2015-107711 A | 6/2015 |
| JP | 2016-108761 A | 6/2016 |
| JP | 2017-172187 A | 9/2017 |
| JP | 2019-55665 A | 4/2019 |
| WO | WO 2019/059028 A1 | 3/2019 |

\* cited by examiner

MOTOR GRADER

TECHNICAL FIELD

The present disclosure relates to a motor grader.

BACKGROUND ART

In connection with a motor grader, US Patent Publication No. 2014/0139009 (PTL 1) discloses an electric motor that drives a front wheel.

CITATION LIST

Patent Literature

PTL 1: US Patent Publication No. 2014/0139009

SUMMARY OF INVENTION

Technical Problem

The literature does not disclose a detailed configuration for supplying electric power to the electric motor. The literature discloses an engine mounted on a rear frame. According to a conventional technical concept, output from an engine may be distributed by a motive power extractor to provide motive power to a generator, the generator may generate electric power by receiving the motive power, and obtained electric power may be fed to an electric motor through a wire harness.

In the motor grader, however, a space above the rear frame is restricted. Therefore, it is difficult to newly secure a place where a generator is provided. Since a wire harness having a large diameter for feeding electric power from the generator to the electric motor is expensive, cost for manufacturing the motor grader increases.

The present disclosure provides a motor grader in which a motive power source of an electric motor can appropriately be arranged.

Solution to Problem

According to the present disclosure, a motor grader including a front frame, a rear frame, and a coupling shaft is provided. The rear frame is arranged in the rear of the front frame. The coupling shaft couples the front frame to the rear frame as being pivotable with respect to the rear frame. The motor grader includes a drive wheel that is rotationally driven to run the motor grader, an electric motor that generates driving force for rotationally driving the drive wheel, and a battery in which electric power supplied to the electric motor is stored. The battery is arranged in front of the coupling shaft.

Advantageous Effects of Invention

According to the present disclosure, a motive power source of an electric motor of a motor grader can appropriately be arranged.

DESCRIPTION OF EMBODIMENTS

Figure 1:
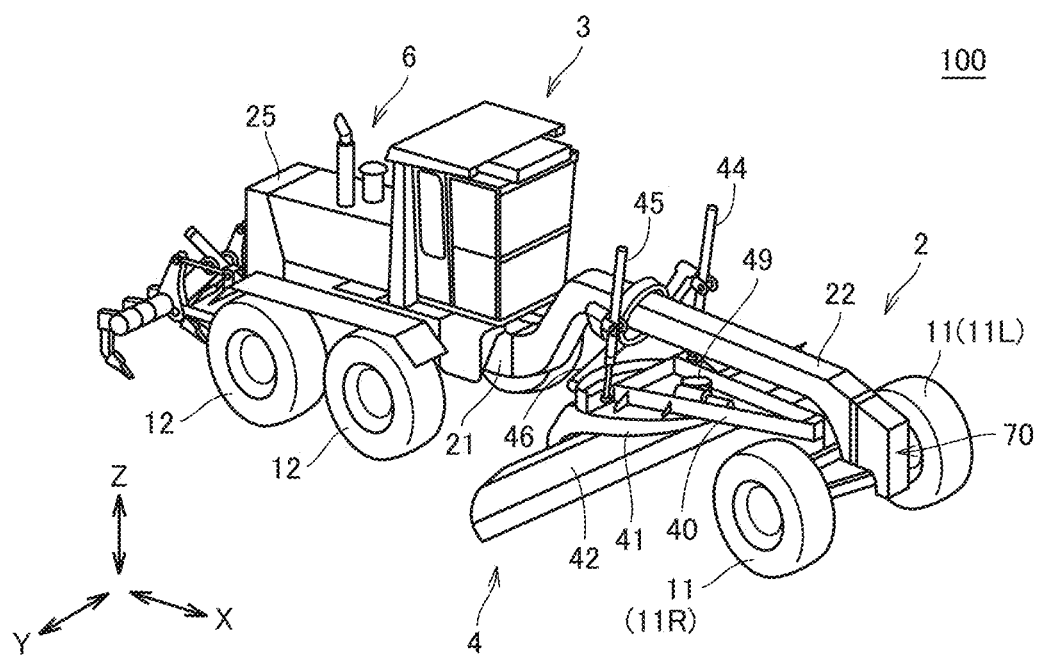
FIG. 1 is a perspective view schematically showing a construction of a motor grader based on an embodiment.

An embodiment will be described below with reference to the drawings. In the description below, the same elements have the same reference characters allotted and their labels and functions are also the same. Therefore, detailed description thereof will not be repeated.

Figure 2:
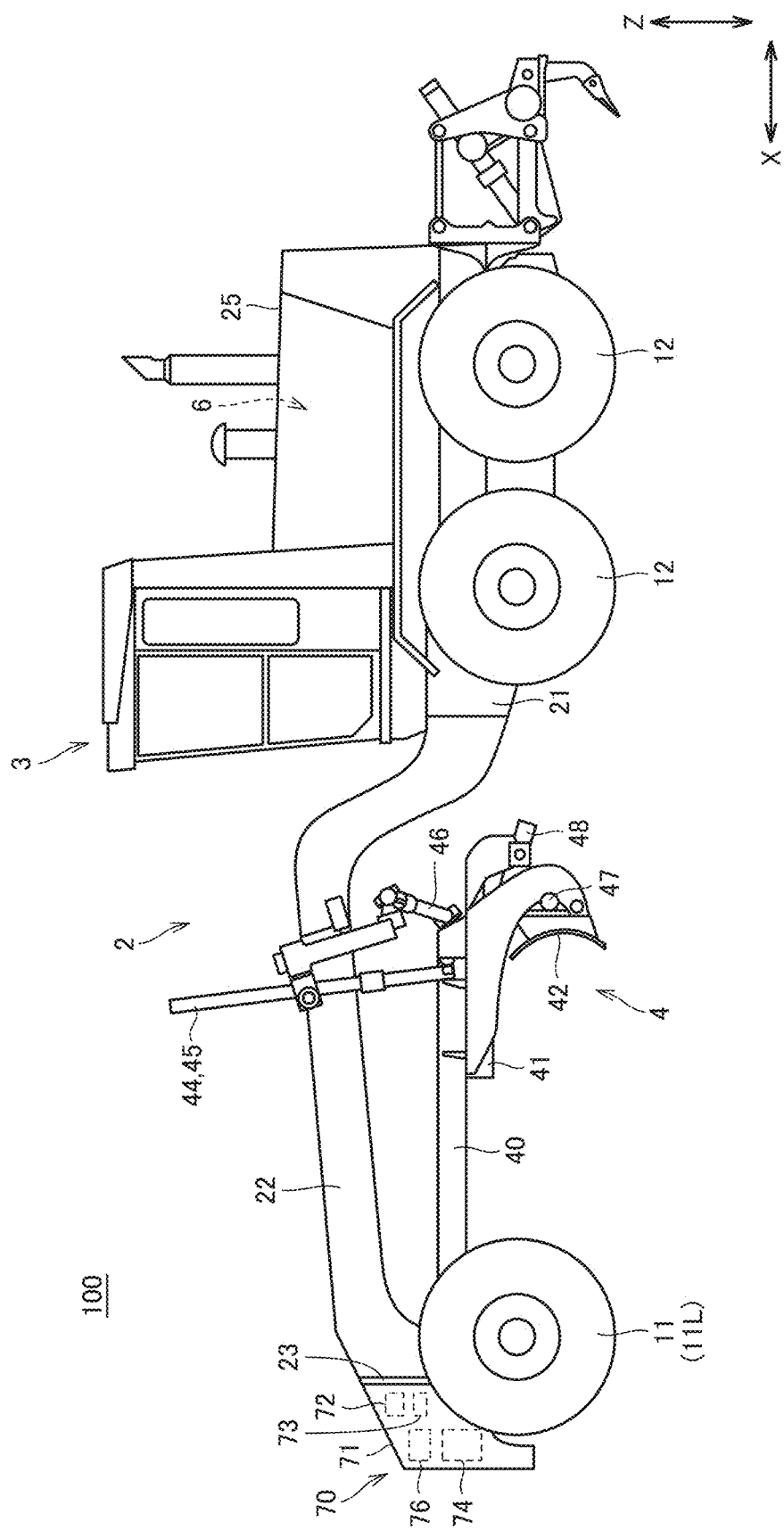
FIG. 2 is a side view of the motor grader shown in FIG. 1.
Figure 3:
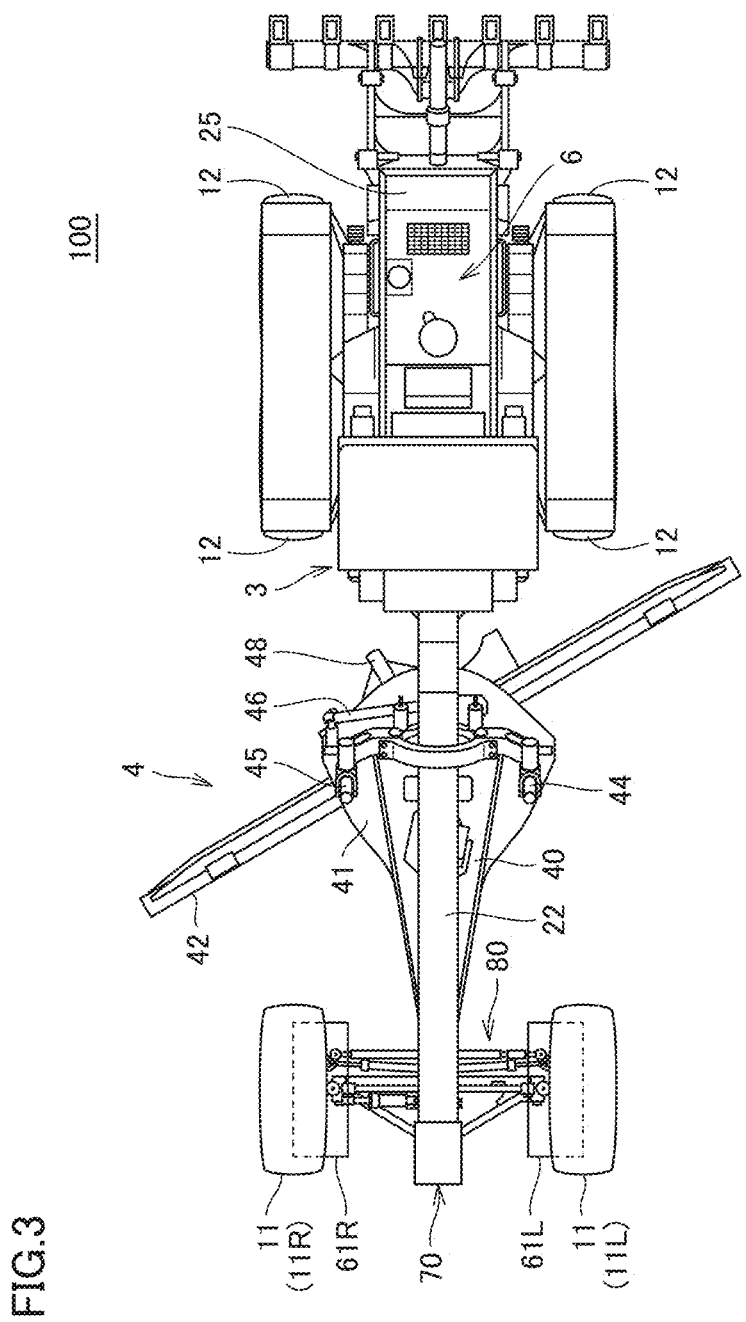
FIG. 3 is a plan view of the motor grader shown in FIG. 1.

FIG. 1 is a perspective view schematically showing a construction of a motor grader 100 based on an embodiment. FIG. 2 is a side view of motor grader 100 shown in FIG. 1. FIG. 3 is a plan view of motor grader 100 shown in FIG. 1.

As shown in FIGS. 1 to 3, motor grader 100 based on the embodiment mainly includes a front wheel 11 which is a running wheel, a rear wheel 12 which is a running wheel, a vehicular body frame 2, an operator's cab 3, and a work implement 4. Front wheel 11 includes one wheel on each of left and right sides and includes a right front wheel 11R and a left front wheel 11L. Though the figure shows running wheels including two front wheels 11, one on each side, and four rear wheels 12, two on each side, the number and arrangement of front wheels and rear wheels are not limited as such.

Motor grader 100 includes components such as an engine arranged in an engine compartment 6. Work implement 4 includes a blade 42. Motor grader 100 can do such works as land-grading works, snow removal works, light cutting, and mixing of materials with blade 42.

In the description of the drawings below, a direction in which motor grader 100 travels in straight lines is referred to as a fore/aft direction of motor grader 100. In the fore/aft direction of motor grader 100, a side where front wheel 11 is arranged with respect to work implement 4 is defined as the fore direction. In the fore/aft direction of motor grader 100, a side where rear wheel 12 is arranged with respect to work implement 4 is defined as the rear direction. A lateral direction or a side of motor grader 100 is a direction orthogonal to the fore/aft direction in a plan view. A right side and a left side in the lateral direction in facing front are defined as a right direction and a left direction, respectively. An upward/downward direction of motor grader 100 is a direction orthogonal to the plane defined by the fore/aft direction and the lateral direction. A side in the upward/downward direction where the ground is located is defined as a lower side and a side where the sky is located is defined as an upper side.

In the drawings below, the fore/aft direction is shown with an arrow X in the drawings, the lateral direction is shown with an arrow Y in the drawings, and the upward/downward direction is shown with an arrow Z in the drawings.

Vehicular body frame 2 includes a rear frame 21 and a front frame 22. Rear frame 21 is arranged in the rear of front frame 22. Rear frame 21 supports an exterior cover 25 and components such as an engine arranged in engine compartment 6. Exterior cover 25 covers engine compartment 6. For example, rear wheels 12, two on each side, are attached to rear frame 21 as being rotationally drivable by driving force from the engine.

Operator's cab 3 is carried on rear frame 21. Operator's cab 3 includes an indoor space which an operator enters and it is arranged at the front end of rear frame 21. Operator's cab 3 may be carried on front frame 22.

In operator's cab 3, an operation portion such as a steering wheel for a revolution operation, a gear shift lever, a lever for controlling work implement 4, a brake, and an accelerator pedal is provided. By operating the steering wheel, an orientation of front wheel 11 is changed so that motor grader 100 can change a direction of travel. By providing a steering lever instead of the steering wheel and operating the lever, the revolution operation may be performed. Alternatively, both of the steering wheel and the steering lever may also be provided.

Front frame 22 is attached in front of rear frame 21. For example, front wheels 11, one on each side, are rotatably attached to a front end portion of front frame 22.

Work implement 4 mainly includes a draw bar 40, a swing circle 41, a blade 42, a hydraulic motor 49, and various cylinders 44 to 48.

Draw bar 40 has a front end portion swingably attached to the tip end portion of front frame 22. Draw bar 40 has a rear end portion supported on front frame 22 by a pair of lift cylinders 44 and 45. As a result of synchronous extending and retracting of the pair of lift cylinders 44 and 45, the rear end portion of draw bar 40 can move up and down with respect to front frame 22. Draw bar 40 is vertically swingable with an axis along a direction of travel of the vehicle being defined as the center, as a result of extending and retracting of lift cylinders 44 and 45 different from each other.

A draw bar shift cylinder 46 is attached to front frame 22 and a side end portion of draw bar 40. As a result of extending and retracting of draw bar shift cylinder 46, draw bar 40 is movable laterally with respect to front frame 22.

Swing circle 41 is revolvably attached to the rear end portion of draw bar 40. Swing circle 41 can be driven by hydraulic motor 49 as being revolvable clockwise or counterclockwise with respect to draw bar 40 when viewed from above the vehicle. As swing circle 41 is driven to revolve, an angle of inclination of blade 42 with respect to front frame 22 in the plan view is adjusted. In work implement 4 shown in FIG. 3, swing circle 41 is located at a position set by counterclockwise revolution in the plan view as compared with arrangement shown in FIGS. 1 and 2. Therefore, blade 42 shown in FIG. 3 is arranged at a position different from blade 42 shown in FIGS. 1 and 2.

Blade 42 is supported on swing circle 41. Blade 42 is supported on front frame 22 with swing circle 41 and draw bar 40 being interposed.

A blade shift cylinder 47 is attached to swing circle 41 and blade 42 and arranged along a longitudinal direction of blade 42. With blade shift cylinder 47, blade 42 is movable in the lateral direction with respect to swing circle 41.

A tilt cylinder 48 is attached to swing circle 41 and blade 42. As a result of extending and retracting of tilt cylinder 48, blade 42 swings around the axis extending in the longitudinal direction thereof with respect to swing circle 41, and can change its orientation in the up/down direction. Tilt cylinder 48 can change an angle of inclination of blade 42 with respect to the direction of travel of the vehicle.

As set forth above, blade 42 is constructed to be able to move up and down with respect to the vehicle, swing around the axis along the direction of travel of the vehicle, change an angle of inclination with respect to the fore/aft direction, move in the lateral direction, and swing around the axis extending in the longitudinal direction thereof, with draw bar 40 and swing circle 41 being interposed.

Figure 4:
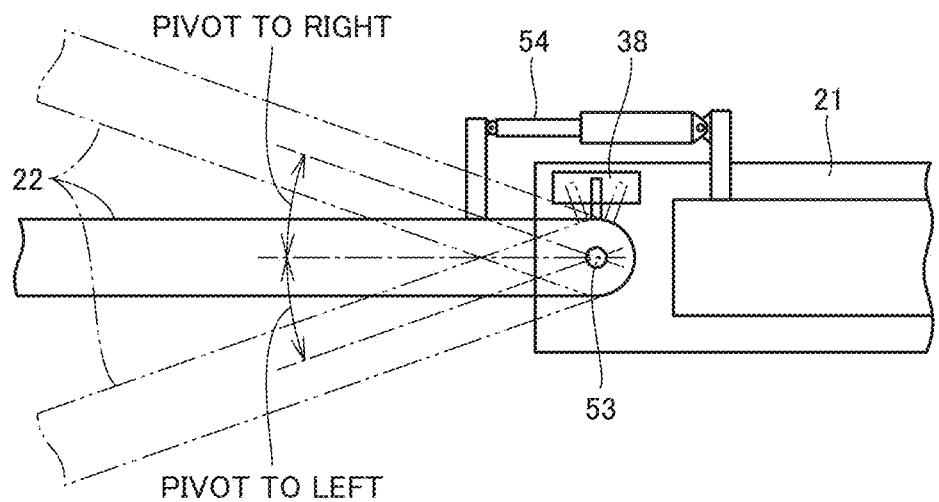
FIG. 4 is a diagram illustrating overview of a construction of a pivot mechanism.

Motor grader 100 can perform an articulation operation for pivoting front frame 22 with respect to rear frame 21. Motor grader 100 includes a pivot mechanism for performing the articulation operation. FIG. 4 is a diagram illustrating overview of a construction of the pivot mechanism.

As shown in FIG. 4, front frame 22 and rear frame 21 are coupled to each other by a coupling shaft 53. Coupling shaft 53 extends in the upward/downward direction (a direction perpendicular to the sheet plane in FIG. 4). Coupling shaft 53 is arranged at a position substantially below operator's cab 3 (not shown in FIG. 4).

Coupling shaft 53 couples front frame 22 to rear frame 21 as being pivotable with respect to rear frame 21. Front frame 22 is revolvable in two directions with respect to rear frame 21 with coupling shaft 53 being defined as the center. An angle formed by front frame 22 with respect to rear frame 21 is adjustable.

Front frame 22 pivots with respect to rear frame 21 as a result of extending and retracting of an articulation cylinder 54 coupled between front frame 22 and rear frame 21 based on an operation from operator's cab 3. An angle sensor 38 is attached to rear frame 21, and the angle sensor detects an angle of articulation representing an angle of pivot of front frame 22 with respect to rear frame 21.

By pivoting (articulating) front frame 22 with respect to rear frame 21, a radius of revolution in revolution of motor grader 100 can be made smaller and a ditch digging work or a grading work by offset running can be done. Offset running refers to linear travel of motor grader 100 by setting a direction of pivot of front frame 22 with respect to rear frame 21 and a direction of revolution of front wheel 11 with respect to front frame 22 to directions opposite to each other.

Referring back to FIGS. 1 to 3, a motive power source unit 70 is attached to the front end of front frame 22. As shown in FIG. 2, motive power source unit 70 includes a unit housing 71, inverters 72 and 73, a battery 74, and a charger 76. Unit housing 71 forms an outer housing of motive power source unit 70. Inverters 72 and 73, battery 74, and charger 76 are accommodated in unit housing 71.

An attachment portion 23 is provided at the front end of front frame 22. Attachment portion 23 is a member to which a push plate is attachable. In motor grader 100 in the embodiment, motive power source unit 70 instead of the push plate is attached to attachment portion 23. Motive power source unit 70 is attached to the front end of front frame 22 with attachment portion 23 being interposed.

Battery 74 included in motive power source unit 70 is attached to attachment portion 23. Battery 74 is attached to the front end of front frame 22 with attachment portion 23 being interposed. Battery 74 is arranged in front of the front end of front frame 22. Battery 74 is arranged in front of blade 42 of work implement 4. Battery 74 is arranged in front of coupling shaft 53 (FIG. 4) that couples front frame 22 and rear frame 21 to each other.

As shown in FIG. 3, in right front wheel 11R, an electric motor 61R that generates driving force for rotationally driving right front wheel 11R is provided. In left front wheel 11L, an electric motor 61L that generates driving force for rotationally driving left front wheel 11L is provided. Motor grader 100 includes an electric front wheel driving unit.

Motor grader 100 in the embodiment is such an all-wheel drive motor grader that rear wheel 12 is rotationally driven by driving force from the engine and right front wheel 11R and left front wheel 11L are rotationally driven by driving force from electric motors 61R and 61L. Each of front wheel 11 (right front wheel 11R and left front wheel 11L) and rear wheel 12 is constructed as a drive wheel that is rotationally driven to run motor grader 100. Front wheel 11 and rear wheel 12 are rotationally driven independently of each other.

Figure 5:
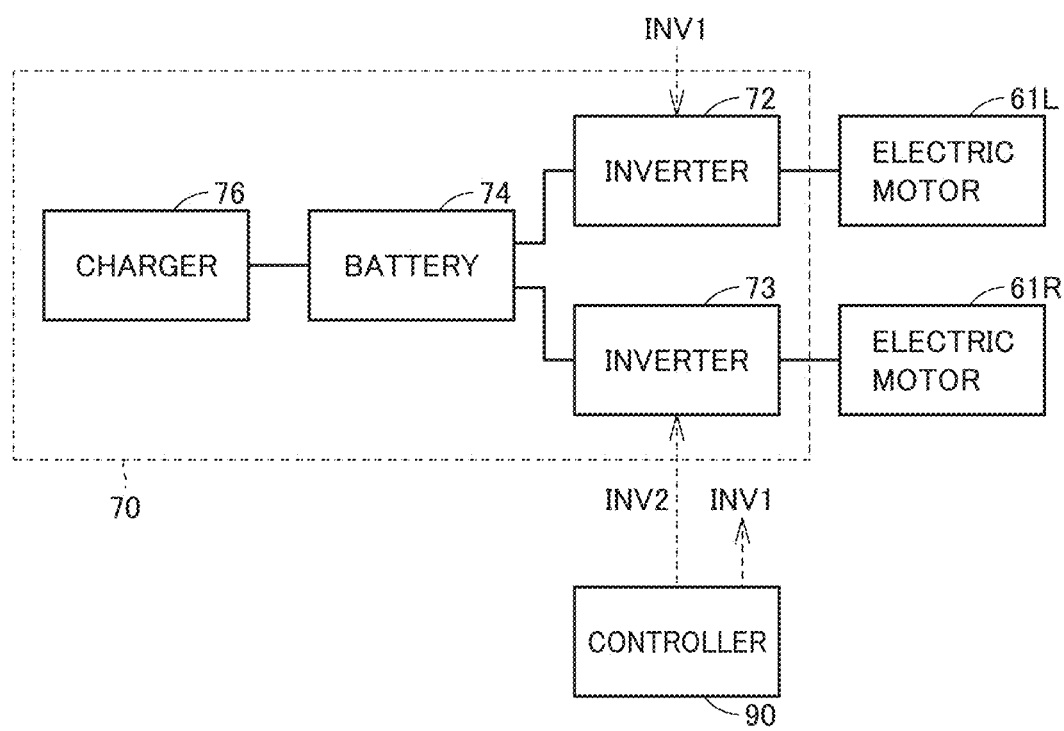
FIG. 5 is a block diagram showing an exemplary electrical configuration of an electric front wheel drive unit.

FIG. 5 is a block diagram showing an exemplary electrical configuration of the electric front wheel drive unit. Electric power to be supplied to electric motors 61R and 61L is stored in battery 74. Charger 76 is a component for charging battery 74. Charger 76 includes a connector for connection to an external power supply. Inverters 72 and 73 convert electric power stored in battery 74 and supply resultant electric power to electric motors 61L and 61R.

Electric motors 61L and 61R are each, for example, a three-phase alternating-current (AC) rotating electric machine. Inverters 72 and 73 are each, for example, a power conversion device capable of conversion of electric power between direct-current (DC) power and AC power.

Electric motor 61L is electrically connected to motive power source unit 70. Specifically, electric motor 61L is electrically connected to inverter 72. Inverter 72 is electrically connected to battery 74. Inverter 72 is controlled by a control signal INV1 from controller 90. Electric power supplied and received between electric motor 61L and inverter 72 and electric power supplied and received between battery 74 and inverter 72 are controlled by control signal INV1 from controller 90.

Controller 90 controls inverter 72 such that drive torque is generated in electric motor 61L. Electric power stored in battery 74 is converted from DC power to AC power by inverter 72 and supplied to electric motor 61L. Electric motor 61L is connected to left front wheel 11L and it generates driving force for rotationally driving left front wheel 11L. Controller 90 controls a rotational operation of left front wheel 11L by transmitting control signal INV1 to inverter 72.

Electric motor 61R is electrically connected to motive power source unit 70. Specifically, electric motor 61R is electrically connected to inverter 73. Inverter 73 is electrically connected to battery 74. Inverter 73 is controlled by a control signal INV2 from controller 90. Electric power supplied and received between electric motor 61R and inverter 73 and electric power supplied and received between battery 74 and inverter 73 are controlled by control signal INV2 from controller 90.

Controller 90 controls inverter 73 such that drive torque is generated in electric motor 61R. Electric power stored in battery 74 is converted from DC power to AC power by inverter 73 and supplied to electric motor 61R. Electric motor 61R is connected to right front wheel 11R and it generates driving force for rotationally driving right front wheel 11R. Controller 90 controls a rotational operation of right front wheel 11R by transmitting control signal INV2 to inverter 73.

Controller 90 may control inverters 72 and 73 such that electric motors 61L and 61R generate regenerative torque, generated regenerative power is supplied to battery 74, and battery 74 is charged therewith. Controller 90 may be arranged in operator's cab 3.

Battery 74 is a DC power supply implemented by a secondary battery such as a lithium ion battery or a nickel metal hydride battery. Battery 74 should only be an element where chargeable and dischargeable DC power is stored, and a capacitor or the like may be employed as the battery. Battery 74 is electrically connected to charger 76. Electric power supplied from an external power supply via charger 76 is stored in battery 74.

Charger 76 includes a connector connectable to a power supply cable extending from the external power supply. DC power may be supplied from the outside to charger 76 and charger 76 may include a circuit capable of converting AC power supplied from the external power supply into DC power. Charger 76 charges battery 74 with DC power.

Motive power source unit 70 may be configured not to include a charger. For example, an apparatus construction may be such that battery 74 that is low in amount of power storage is removed from front frame 22, removed battery 74 is charged by using an external charger, and recharged battery 74 is attached again to front frame 22.

Figure 6:
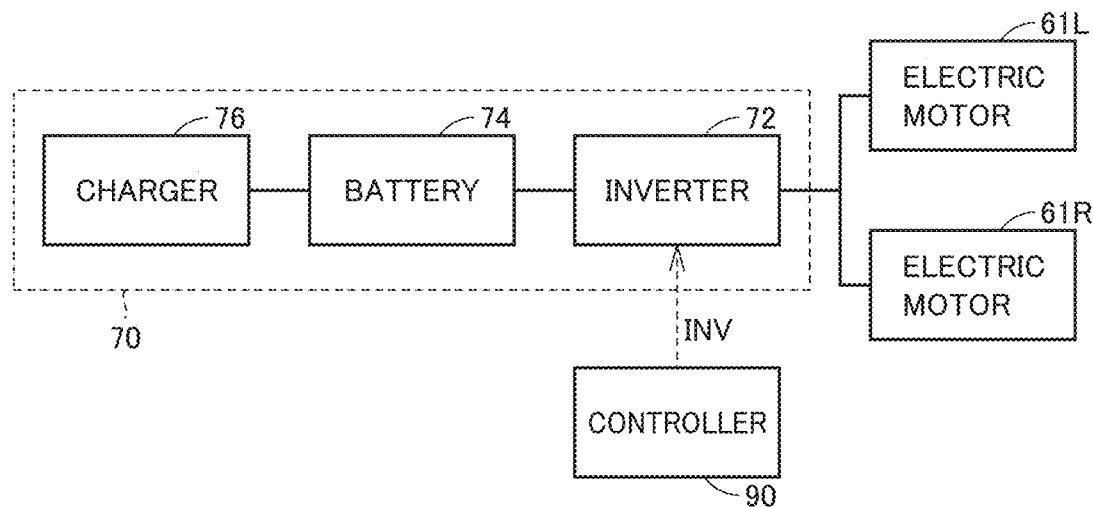
FIG. 6 is a block diagram showing another exemplary electrical configuration of the electric front wheel drive unit.

FIG. 6 is a block diagram showing another exemplary electrical configuration of the electric front wheel drive unit. The configuration may be such that motive power source unit 70 includes only a single inverter 72 instead of an example in which motive power source unit 70 includes two inverters 72 and 73 shown in FIGS. 2 and 5. In this case, one inverter 72 is electrically connected to electric motors 61L and 61R and electric power is supplied from inverter 72 to both of electric motors 61L and 61R. Inverter 72 is controlled by a control signal INV from controller 90.

Figure 7:
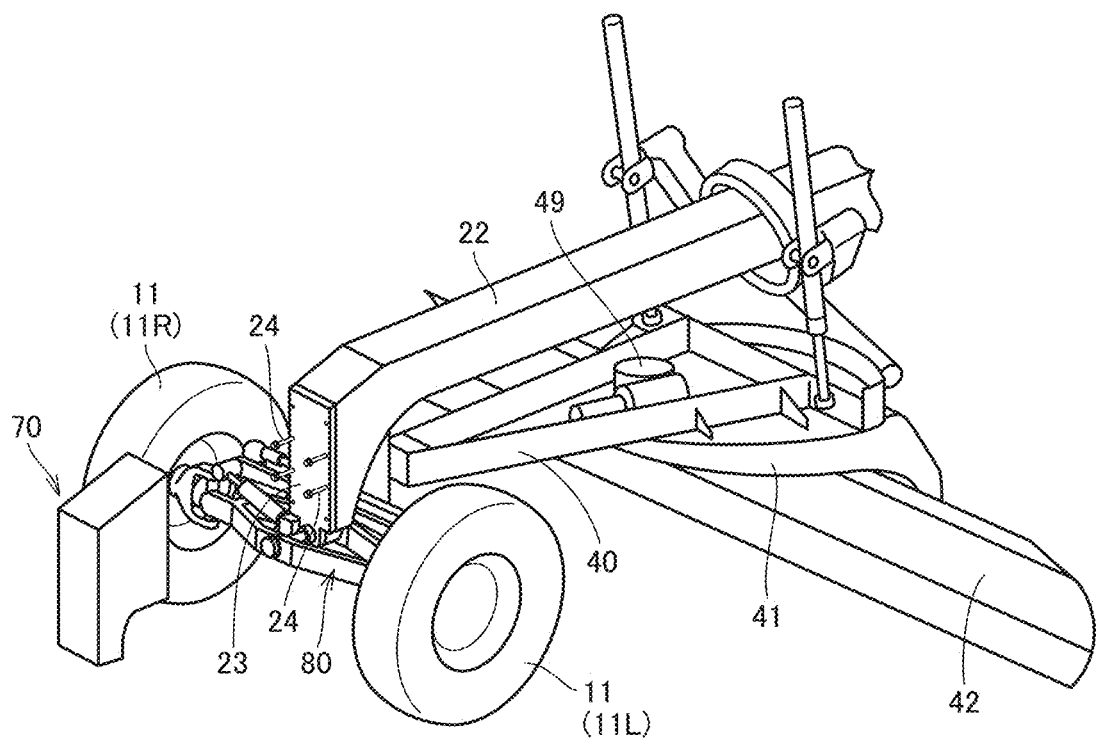
FIG. 7 is a perspective view showing a motive power source unit removed from a front frame.

FIG. 7 is a perspective view showing motive power source unit 70 removed from front frame 22. Attachment portion 23 is in a shape of a plate and it is arranged at the front end of front frame 22. Motive power source unit 70 is attached to attachment portion 23 by using a plurality of attachment bolts 24.

As shown in FIG. 7, by removing attachment bolts 24 from motive power source unit 70, motive power source unit 70 is removed from attachment portion 23. Motive power source unit 70 is attached to front frame 22 as being integrally removable from front frame 22. Inverters 72 and 73, battery 74, and charger 76 included in motive power source unit 70 are attached to the front end of front frame 22 as being integrally removable from front frame 22.

A front axle 80 is attached to a lower end of the front end of front frame 22. Front axle 80 is attached to front frame 22 as being swingable with respect to front frame 22. Left front wheel 11L is attached to a left end of front axle 80. Right front wheel 11R is attached to a right end of front axle 80. Front axle 80 supports left front wheel 11L and right front wheel 11R such that they can rotate and can laterally be leaned. Left front wheel 11L and right front wheel 11R are attached to front frame 22 with front axle 80 being interposed.

Figure 8:
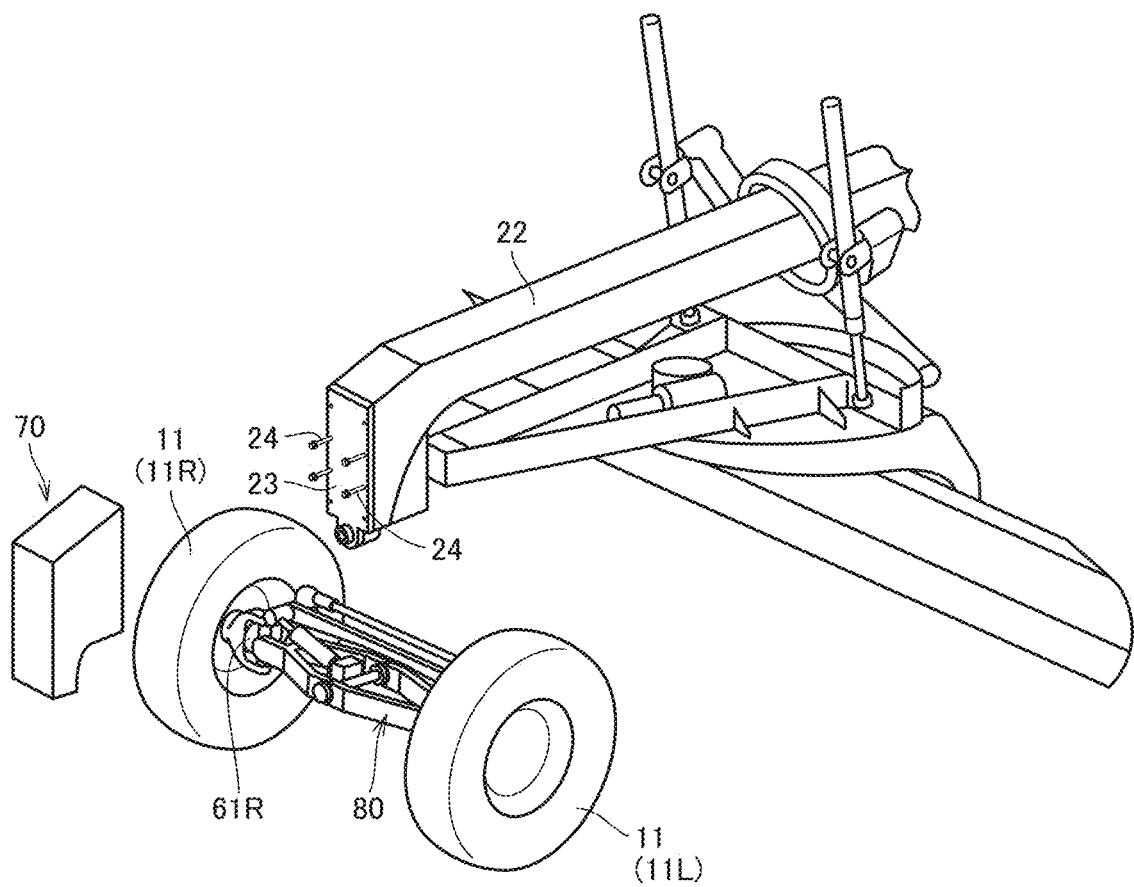
FIG. 8 is a perspective view showing a front axle removed from the front frame.

FIG. 8 is a perspective view showing front axle 80 removed from front frame 22. As shown in FIG. 8, front axle 80 is removable from front frame 22.

Electric motor 61R is attached to front axle 80 in the vicinity of the right end of front axle 80. Electric motor 61L not shown in FIG. 8 is attached to front axle 80 in the vicinity of the left end of front axle 80. Electric motors 61L and 61R and front wheel 11 are attached to front frame 22 as being integrally removable from front frame 22. Left front wheel 11L and right front wheel 11R, front axle 80, and electric motors 61L and 61R are attached to front frame 22 as being integrally removable from front frame 22.

Figure 9:
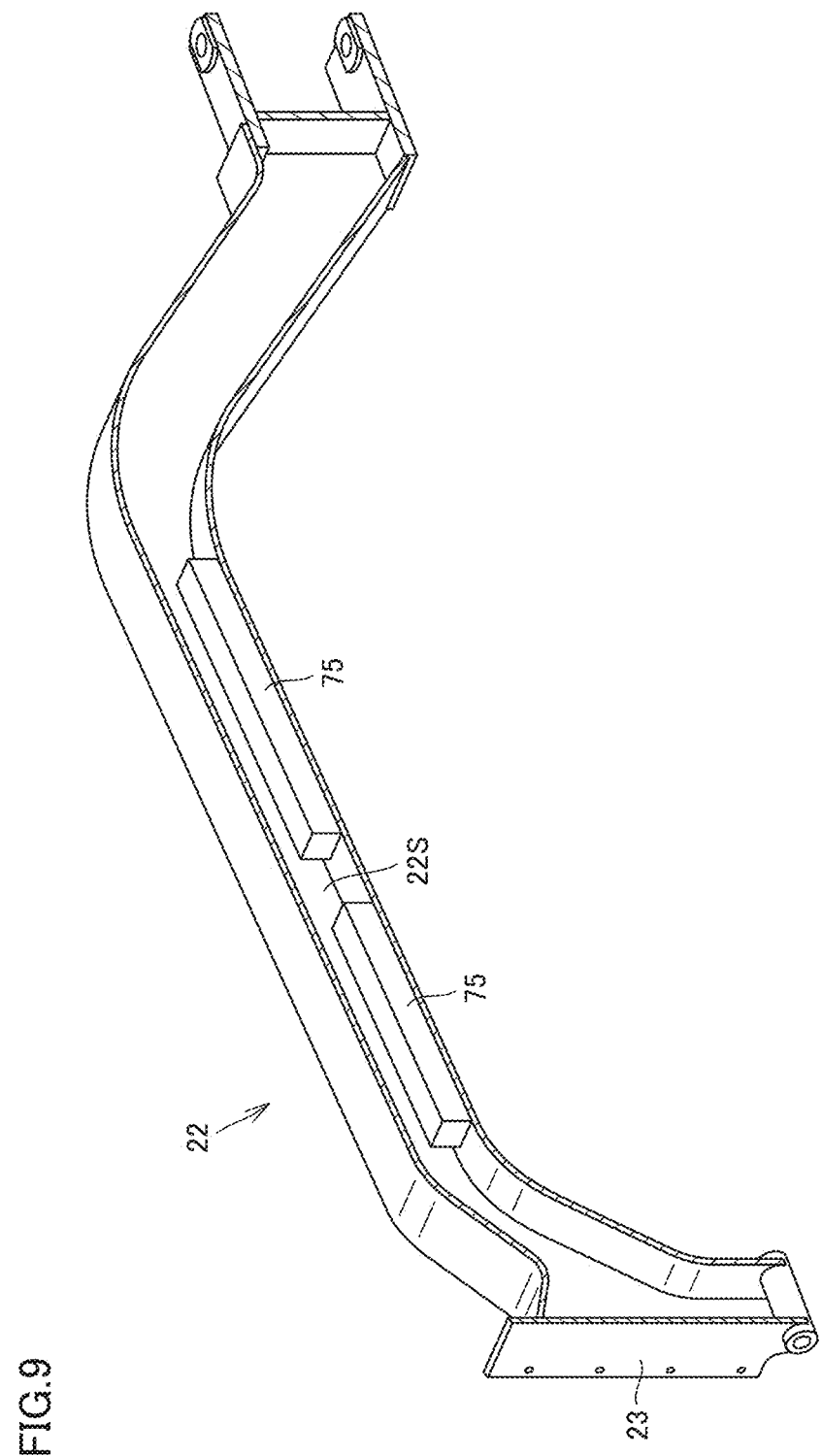
FIG. 9 is a cross-sectional view showing a space in the inside of the front frame.

FIG. 9 is a cross-sectional view showing a space 22S in the inside of front frame 22. FIG. 9 shows a cross-section of front frame 22 along the upward/downward direction and the fore/aft direction. Front frame 22 is hollow. Space 22S is provided in the inside of front frame 22.

An auxiliary battery 75 is accommodated in space 22S. Electric power to be supplied to electric motors 61L and 61R is stored in auxiliary battery 75, in addition to battery 74 described previously. Auxiliary battery 75 is attached to front frame 22. Auxiliary battery 75 arranged in front frame 22 is arranged in the rear of the front end of front frame 22. Auxiliary battery 75 is arranged in front of blade 42 of work implement 4. Auxiliary battery 75 is arranged in front of coupling shaft 53 (FIG. 4) that couples front frame 22 and rear frame 21 to each other.

Figure 10:
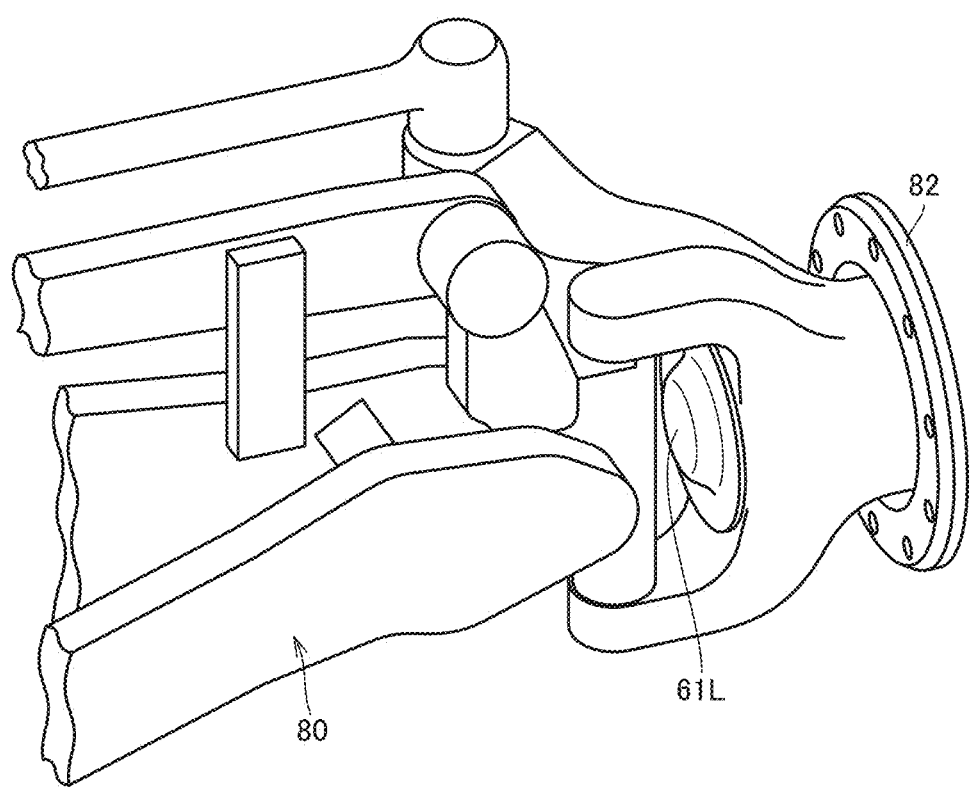
FIG. 10 is a perspective view showing an end of the front axle.

FIG. 10 is a perspective view showing an end of front axle 80. FIG. 10 shows the left end of front axle 80. A front wheel attachment portion 82 is provided at the left end of front axle 80. Left front wheel 11L is attached to front wheel attachment portion 82. Left front wheel 11L is supported by front axle 80 by being attached to front wheel attachment portion 82 shown in FIG. 10.

Electric motor 61L is attached to front axle 80 in the vicinity of the left end of front axle 80. Electric motor 61L and front wheel attachment portion 82 are attached to front axle 80 as being integrally removable from front axle 80.

A similar front wheel attachment portion is provided also at the right end of front axle 80, and right front wheel 11R is attached to this front wheel attachment portion. Electric motor 61R and the front wheel attachment portion are attached to front axle 80 as being integrally removable from front axle 80.

Figure 11:
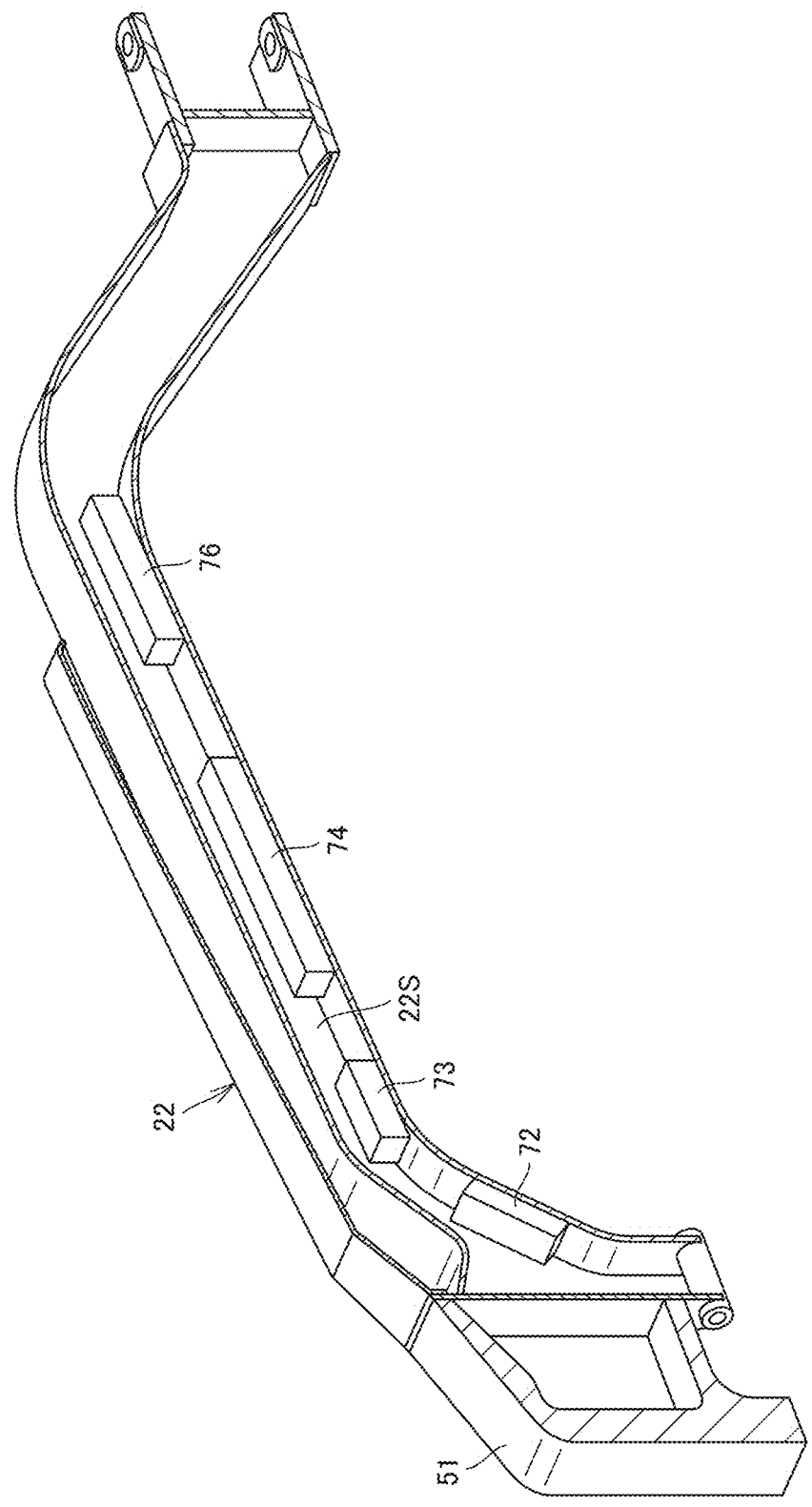
FIG. 11 is a cross-sectional view showing another example of arrangement of a battery.

FIG. 11 is a cross-sectional view showing a modification of arrangement of battery 74. FIG. 11 shows a cross-section of front frame 22 along the upward/downward direction and the fore/aft direction. A push plate 51 instead of motive power source unit 70 described above is attached to attachment portion 23 at the front end of front frame 22 shown in FIG. 11.

Inverters 72 and 73, battery 74, and charger 76 included in motive power source unit 70 are not provided in push plate 51. Inverters 72 and 73, battery 74, and charger 76 are directly attached to front frame 22. Inverters 72 and 73, battery 74, and charger 76 are arranged in the inside of front frame 22. Front frame 22 is hollow, and space 22S is provided in the inside. Inverters 72 and 73, battery 74, and charger 76 are accommodated in space 22S. Charger 76 does not necessarily have to be arranged in space 22S.

When a front blade instead of push plate 51 shown in FIG. 11 is attached to attachment portion 23 as well, inverters 72 and 73, battery 74, and charger 76 can be arranged in the inside of front frame 22.

Instead of the construction above, the construction may be such that battery 74 or battery 74 and charger 76 is/are attached to attachment portion 23 at the front end of front frame 22 and inverters 72 and 73 may be accommodated in space 22S in the inside of front frame 22. Battery 74 higher in capacity is attached to attachment portion 23 as being removable therefrom, so that a time period during which motor grader 100 can operate as an all-wheel drive motor grader can be longer.

Functions and effects of the embodiment described above will now be described.

Motor grader 100 in the embodiment includes coupling shaft 53, front wheel 11, electric motors 61L and 61R, and battery 74. As shown in FIG. 4, coupling shaft 53 couples front frame 22 to rear frame 21 as being pivotable with respect to rear frame 21. Front wheel 21 is a drive wheel that is rotationally driven to run motor grader 100. Electric motors 61L and 61R generate driving force for rotationally driving front wheel 11. Electric power to be supplied to electric motors 61L and 61R is stored in battery 74. As shown in FIGS. 2 and 4, battery 74 is arranged in front of coupling shaft 53.

Since battery 74 is not mounted on rear frame 21, a space for mounting battery 74 on rear frame 21 is not required. Battery 74 serving as a motive power source of electric motors 61L and 61R can thus appropriately be arranged. By arranging battery 74 near front wheel 11 which is a drive wheel, a wire harness that electrically connects battery 74 and electric motors 61L and 61R to each other can be shorter. Increase in manufacturing cost can thus be suppressed.

As shown in FIG. 2, battery 74 is attached to front frame 22. Arrangement to provide battery 74 in front of coupling shaft 53 can thus reliably be achieved.

As shown in FIGS. 2 and 5, motor grader 100 includes motive power source unit 70. Motive power source unit 70 includes battery 74, charger 76 that charges battery 74, and inverters 72 and 73 that convert electric power stored in battery 74 and supply resultant electric power to electric motors 61L and 61R. Motive power source unit 70 is attached to front frame 22. By attaching battery 74, charger 76, and inverters 72 and 73 as one unit to front frame 22, motive power source unit 70 as a whole can readily be replaced when an amount of power storage in battery 74 is lowered. By recharging battery 74 of motive power source unit 70 removed from front frame 22, this motive power source unit can be prepared as motive power source unit 70 for next replacement.

As shown in FIGS. 1 to 3, battery 74 is attached to the front end of front frame 22. By attaching battery 74 to attachment portion 23 at the front end of front frame 22 to which a push plate is attachable in motor grader 100, battery 74 can appropriately be arranged without influence on arrangement of another apparatus and equipment. Since a length of the wire harness for electrical connection between battery 74 and electric motors 61L and 61R can reliably be reduced, increase in manufacturing cost can further be suppressed.

By attaching motive power source unit 70 to the front end of front frame 22, battery 74, charger 76, and inverters 72 and 73 included in motive power source unit 70 are arranged in the vicinity of front wheel 11 in a concentrated manner. A conventional rear-wheel drive motor grader can thus readily be modified into an all-wheel drive motor grader simply by altering the vicinity of the front end of front frame 22.

As shown in FIG. 8, motor grader 100 includes auxiliary battery 75. Auxiliary battery 75 is arranged in front frame 22. By arranging auxiliary battery 75 in hollow space 22S in the inside of front frame 22, auxiliary battery 75 can appropriately be arranged without influence on arrangement of another apparatus and equipment.

As shown in FIG. 3, electric motors 61L and 61R rotationally drive front wheel 11 attached to front frame 22. By subsequently attaching battery 74 and electric motors 61L and 61R to the conventional rear-wheel motor grader, modification to all-wheel drive motor grader 100 can readily be made.

As shown in FIG. 7, electric motors 61L and 61R and front wheels 11 are attached to front frame 22 as being integrally removable from front frame 22. By removing front wheels of the conventional rear-wheel drive motor grader from front frame 22 and integrally attaching electric motors 61L and 61R and front wheels 11 to front frame 22, modification to all-wheel drive motor grader 100 can readily be made.

As shown in FIG. 7, left front wheel 11L and right front wheel 11R, front axle 80, and electric motors 61L and 61R are attached to front frame 22 as being integrally removable from front frame 22. By removing the front axle of the conventional rear-wheel drive motor grader from front frame 22 and integrally attaching left front wheel 11L and right front wheel 11R, front axle 80, and electric motors 61L and 61R to front frame 22, modification to all-wheel drive motor grader 100 can readily be made.

As shown in FIG. 9, electric motor 61L and front wheel attachment portion 82 are attached to front axle 80 as being integrally removable from front axle 80. By removing the front wheel attachment portion of the conventional rear-wheel drive motor grader from front axle 80, attaching a unit including electric motor 61L and front wheel attachment portion 82 to front axle 80, and further attaching left front wheel 11L to front wheel attachment portion 82, modification to all-wheel drive motor grader 100 can readily be made.

Modification to the all-wheel drive motor grader may be made by shipping a unit including motive power source unit 70 and electric motors 61L and 61R from a factory to a site where shipped motor grader 100 is located and attaching the unit to a rear-wheel drive motor grader at the site. Alternatively, modification of the rear-wheel drive motor grader to the all-wheel drive motor grader may be made before shipment of a product from the factory.

In the description of the embodiment above, an example in which electric motor 61L is provided in left front wheel 11L, electric motor 61R is provided in right front wheel 11R, and electric motors 61L and 61R are in-wheel motors is described. Instead of this example, a construction in which a single electric motor is attached to front axle 80 and this single electric motor provides driving force to both of left front wheel 11L and right front wheel 11R may be applicable.

It should be understood that the embodiment disclosed herein is illustrative and non-restrictive in every respect. The scope of the present invention is defined by the terms of the claims rather than the description above and is intended to include any modifications within the scope and meaning equivalent to the terms of the claims.

REFERENCE SIGNS LIST

2 vehicular body frame; 3 operator's cab; 4 work implement; 6 engine compartment; 11 front wheel; 11L left front wheel; 11R right front wheel; 12 rear wheel; 21 rear frame; 22 front frame; 22S space; 23 attachment portion; 24 attachment bolt; 38 angle sensor; 40 draw bar; 41 swing circle; 42 blade; 51 push plate; 53 coupling shaft; 54 articulation cylinder; 61L, 61R electric motor; 70 motive power source unit; 71 unit housing; 72, 73 inverter; 74 battery; 75 auxiliary battery; 76 charger; 80 front axle; 82 front wheel attachment portion; 90 controller; 100 motor grader; INV, INV1, INV2 control signal; X fore/aft direction; Y lateral direction; Z upward/downward direction

The invention claimed is:

1. A motor grader including a front frame, a rear frame arranged in rear of the front frame, and a coupling shaft that couples the front frame to the rear frame as being pivotable with respect to the rear frame, the motor grader comprising
   a drive wheel that is rotationally driven to run the motor grader, the drive wheel including a front wheel and a rear wheel;
   a battery that stores electric power and is arranged in front of the coupling shaft; and
   an electric motor to which electric power is supplied from the battery to generate driving force for rotationally driving the front wheel.

2. The motor grader according to claim 1, wherein the battery is attached to the front frame.

3. The motor grader according to claim 2, comprising a motive power source unit including the battery and an inverter that converts electric power stored in the battery and supplies resultant electric power to the electric motor, wherein
   the motive power source unit is attached to the front frame.

4. The motor grader according to claim 3, wherein the motive power source unit further includes a charger that charges the battery.

5. The motor grader according to claim 2, wherein the battery is attached to a front end of the front frame.

6. The motor grader according to claim 2, wherein the battery is arranged in the front frame.

7. The motor grader according to claim 1, wherein the drive wheel is a front wheel attached to the front frame.

8. A motor grader including a front frame, a rear frame arranged in rear of the front frame, and a coupling shaft that couples the front frame to the rear frame as being pivotable with respect to the rear frame, the motor grader comprising:
   a drive wheel that is rotationally driven to run the motor grader;
   an electric motor that generates driving force for rotationally driving the drive wheel; and
   a battery in which electric power supplied to the electric motor is stored, wherein
   the battery is arranged in front of the coupling shaft,
   wherein the drive wheel is a front wheel attached to the front frame,
   wherein the electric motor and the front wheel are attached to the front frame as being integrally removable from the front frame.

9. The motor grader according to claim 8, wherein
   the front wheel includes a left front wheel and a right front wheel,
   the motor grader further comprises a front axle that rotatably supports the left front wheel and the right front wheel, and
   the left front wheel and the right front wheel, the front axle, and the electric motor are attached to the front frame as being integrally removable from the front frame.

10. A motor grader including a front frame, a rear frame arranged in rear of the front frame, and a coupling shaft that couples the front frame to the rear frame as being pivotable with respect to the rear frame, the motor grader comprising:
   a drive wheel that is rotationally driven to run the motor grader;
   an electric motor that generates driving force for rotationally driving the drive wheel;
   a battery in which electric power supplied to the electric motor is stored;
   a front axle that rotatably supports the front wheel; and
   a front wheel attachment portion to which the front wheel is attached, the front wheel attachment portion being provided at an end of the front axle, wherein the battery is arranged in front of the coupling shaft, wherein the drive wheel is a front wheel attached to the front frame, wherein the electric motor and the front wheel attachment portion are attached to the front axle as being integrally removable from the front axle.

11. The motor grader according to claim 1, wherein the electric motor and the front wheel are attached to the front frame and adjacent to each other.

* * * * *